US009754618B1

(12) United States Patent
Srinivasan et al.

(10) Patent No.: US 9,754,618 B1
(45) Date of Patent: Sep. 5, 2017

(54) HEAT-ASSISTED MAGNETIC RECORDING (HAMR) MEDIUM INCLUDING A SPLIT HEAT-SINK STRUCTURE (SHSS)

(71) Applicant: WD Media, LLC, San Jose, CA (US)

(72) Inventors: Kumar Srinivasan, Redwood City, CA (US); Antony Ajan, San Jose, CA (US); George M. Chapline, Alamo, CA (US)

(73) Assignee: WD MEDIA, LLC, San Jose, CA (US)

( * ) Notice: Subject to any disclaimer, the term of this patent is extended or adjusted under 35 U.S.C. 154(b) by 0 days.

(21) Appl. No.: 15/136,195

(22) Filed: Apr. 22, 2016

(51) Int. Cl.
| G11B 11/00 | (2006.01) |
| G11B 5/66 | (2006.01) |
| G11B 5/84 | (2006.01) |
| G11B 5/00 | (2006.01) |
| G11B 11/105 | (2006.01) |

(52) U.S. Cl.
CPC .............. *G11B 5/66* (2013.01); *G11B 5/84* (2013.01); *G11B 11/10582* (2013.01); *G11B 11/10586* (2013.01); *G11B 11/10589* (2013.01); *G11B 2005/0021* (2013.01)

(58) Field of Classification Search
None
See application file for complete search history.

(56) References Cited

U.S. PATENT DOCUMENTS

| 5,981,017 | A | 11/1999 | Agarwal et al. |
| 7,862,914 | B2 | 1/2011 | Kubota et al. |
| 8,270,286 | B2 | 9/2012 | Kanbe et al. |
| 8,507,114 | B2 | 8/2013 | Peng et al. |
| 8,509,039 | B1 * | 8/2013 | Huang .................... G11B 5/65 369/13.02 |
| 8,570,844 | B1 | 10/2013 | Yuan et al. |
| 8,576,672 | B1 | 11/2013 | Peng et al. |
| 8,605,555 | B1 | 12/2013 | Chernyshov et al. |
| 8,609,263 | B1 * | 12/2013 | Chernyshov ......... G11B 5/7325 427/131 |
| 8,765,273 | B1 * | 7/2014 | Kubota .................... G11B 5/66 360/59 |
| 8,811,129 | B1 | 8/2014 | Yuan et al. |

(Continued)

OTHER PUBLICATIONS

Srinivasan, et al., U.S. Appl. No. 15/089,145, filed Apr. 1, 2016, 33 pages.

*Primary Examiner* — Tan X Dinh
(74) *Attorney, Agent, or Firm* — Loza & Loza, LLP; Gabriel Fitch

(57) ABSTRACT

A heat-assisted magnetic recording (HAMR) medium includes a substrate, a split heat-sink structure (SHSS) and a magnetic recording layer. The SHSS includes a first heat-sink layer disposed on the substrate, a heat-sink break layer (HSBL) disposed on the first heat-sink layer, and a second heat-sink layer disposed on the HSBL. The magnetic recording layer is disposed on the SHSS. The SHSS is configured to enable use of a reduced operating current of the laser while maintaining about the same write performance properties as a thermal barrier layer, heat-assisted magnetic recording (TBLHAMR) medium that includes a thermal barrier layer (TBL) and a heat-sink layer that is greater than about 20% thicker than the thickness of the SHSS. A HAMR data storage device that incorporates the HAMR medium within a HAMR disk, and a method for making the HAMR medium are also described.

22 Claims, 4 Drawing Sheets

(56) References Cited

U.S. PATENT DOCUMENTS

| | | |
|---|---|---|
| 8,867,322 B1 | 10/2014 | Chernyshov et al. |
| 9,177,585 B1* | 11/2015 | Seki .................. G11B 5/7325 369/13.33 |
| 2006/0251992 A1* | 11/2006 | Van Kesteren ........ G11B 7/241 430/270.13 |
| 2007/0026263 A1* | 2/2007 | Kubota .................... G11B 5/65 428/832 |
| 2012/0251842 A1 | 10/2012 | Yuan et al. |
| 2012/0300600 A1 | 11/2012 | Kanbe et al. |
| 2012/0307398 A1 | 12/2012 | Kanbe et al. |
| 2013/0176838 A1* | 7/2013 | Sendur .................. B82Y 10/00 369/13.24 |
| 2014/0272473 A1 | 9/2014 | Chen et al. |
| 2015/0013946 A1* | 1/2015 | Ju ............................ F28F 3/08 165/133 |
| 2015/0085628 A1 | 3/2015 | Niwa et al. |
| 2015/0154995 A1* | 6/2015 | Chen ...................... G11B 5/746 369/13.4 |

* cited by examiner

HEAT-ASSISTED MAGNETIC RECORDING (HAMR) MEDIUM INCLUDING A SPLIT HEAT-SINK STRUCTURE (SHSS)

BACKGROUND

Heat-assisted magnetic recording (HAMR) is a recent technological development that is designed to increase the areal density (AD) of written data by recording data in a magnetic recording medium having higher coercivity, $H_c$, than can be written by a magnetic field from a magnetic recording head without assistance. By heating the surface of the magnetic recording medium with a laser spot during write operations, coercivity of the magnetic recording medium is reduced so that the magnetic field of the magnetic recording head can record data in the magnetic recording medium at high AD.

DETAILED DESCRIPTION

Figure 1:
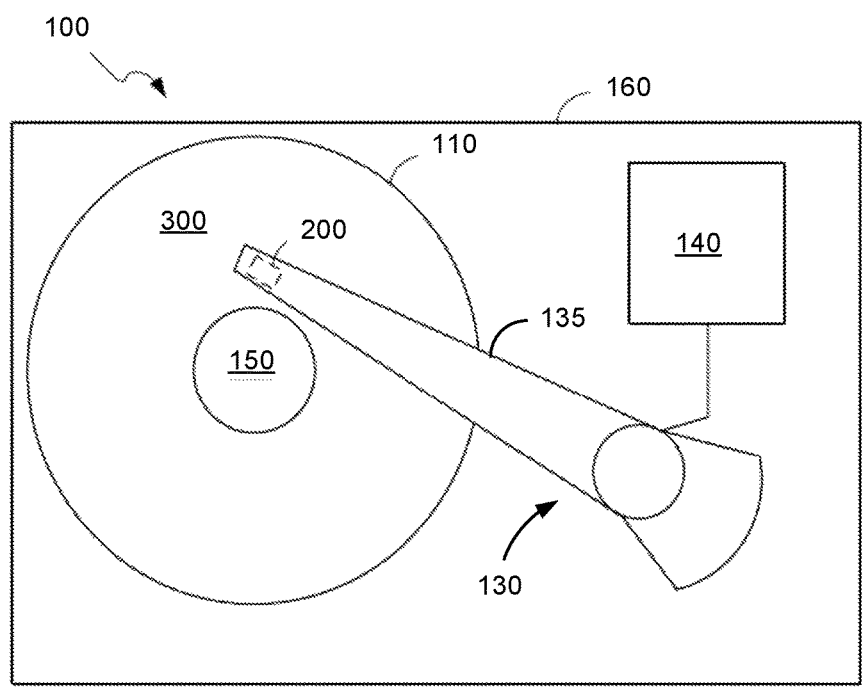
FIG. 1 is a top schematic view of a heat-assisted magnetic recording (HAMR) data storage device, by way of example, a disk drive, that includes a HAMR medium with a split heat-sink structure (SHSS) including a first heat-sink layer, a heat-sink break layer (HSBL) and a second heat-sink layer, according to one embodiment.

To achieve magnetic data storage levels beyond 1 terabit per inch squared (1 Tb/in$^2$) for high areal density (AD) in heat-assisted magnetic recording (HAMR), magnetic recording media having small grain size, less than about 6 nanometer (nm), are employed. Such designs utilize high magnetic-anisotropy, $K_u$, materials for the magnetic recording layer of the magnetic recording medium, such as L1o ordered FePt alloys, to provide for thermal stability of the recorded bits in the magnetic recording layer, which otherwise would demagnetize due to superparamagetism attending small magnetic grains having lesser $K_u$. Consequently, due to the high $K_u$, HAMR media are not writable with conventional magnetic recording heads at ambient temperatures, but can be written if $H_c$ that depends on $K_u$ is reduced by heating the HAMR medium in a hot spot made by a laser on the HAMR medium. In addition, reduced $H_c$ at elevated temperatures enables much higher effective writing-field gradients than conventional perpendicular magnetic recording (PMR), because the effective writing-field gradient is defined by the product of thermal gradient (dT/dx) and slope of the temperature dependence of the anisotropy field (dHk/dT). HAMR media, besides including a magnetic recording layer, may also include a heat-sink layer positioned beneath the magnetic recording layer to facilitate efficient writing of the HAMR medium with reduced laser power. Thermal energy is dissipated from the magnetic recording layer with the aid of the heat-sink layer, "freezing in" the magnetization of a recorded bit in the magnetic recording layer. However, heat-sink layers may not dissipate the thermal energy deposited by the laser in the magnetic recording layer quickly enough for the best magnetic recording properties.

Thermal design for HAMR media employs the combination of one or more layers with careful consideration given to thermal and optical properties of the heat-sink material. The objective of the thermal design is to obtain high thermal gradients in the cross-track and down-track directions. However, this is not to be achieved at the expense of thicker heat-sink layers that utilize higher laser power and have a detrimental effect on HAMR-head lifetime. Therefore, much effort has been dedicated towards tailoring the thermal design of HAMR media using a thermal barrier layer (TBL), also referred to as a thermal resistor layer (TRL), to maximize signal-to-noise ratio (SNR) at reduced laser power in order to provide a pathway towards high AD and improved reliability. Throughout the following, a design using a TBL will be referred to herein as thermal barrier layer, heat-assisted magnetic recording (TBLHAMR) design; a HAMR medium based on the TBLHAMR design, as a TBLHAMR medium; and a data storage device utilizing a TBLHAMR medium, as a TBLHAMR data storage device.

While not bound by any particular theory, the thicknesses and thermal properties of both the TBL and the heat-sink layer are selected to ensure the highest thermal gradient per laser power that a HAMR head might sustain. An ideal heat-sink layer can have as high as possible thermal conductivity, $\kappa$, and an ideal TBL can have as low as possible $\kappa$. The latter ensures that a TBL is relatively thin and that lateral heat diffusion in the TBL is of limited extent. The optical properties of the TBL are also of interest. As observed experimentally, the magnetic recording layer could generally absorb only a portion of light coming from a nearby near-field transducer (NFT); and therefore, a significant portion of incoming NFT and waveguide light could be absorbed in the TBL depending on its optical properties. The latter absorption effect would degrade both on-track and off-track HAMR media recording performance, especially if side lobes from a waveguide are present.

According to embodiments described herein, to minimize the above-described disadvantages associated with the TBLHAMR medium, a new thermal design that does not employ the TBL is used. According to embodiments described herein, by utilizing a split heat-sink structure (SHSS) that includes a first heat-sink layer and a second heat sink layer with a heat-sink break layer (HSBL) sandwiched between the first heat-sink layer and the second heat sink layer improved magnetic recording performance can be achieved at lower laser power consumption. Moreover, according to embodiments described herein, by selecting the composition and controlling the microstructure of the HSBL, the thermal conductivity, $\kappa$, of the SHSS can be tuned to reduce the total thickness of the SHSS of HAMR medium by about 20 percent (%) less compared to a corresponding thickness of the heat-sink layer of TBLHAMR medium, while achieving similar SNR comparable to that of the TBLHAMR medium. Moreover, according to embodiments described herein, a new thermal design based on the above-described SHSS also reduces the laser power for magnetic recording in a HAMR medium that includes the SHSS compared to the laser power of the TBLHAMR medium. As a result, embodiments described herein eliminate the use of an oxide-based TBL that utilizes costly and maintenance-intensive, radio-frequency (RF) sputtering for fabrication. Moreover, embodiments described herein significantly improve the manufacturability of the new HAMR medium that includes the above-described SHSS.

Moreover, according to embodiments described herein, the new HAMR medium structure that includes the SHSS including the first heat-sink layer and the second heat sink layer with the HSBL sandwiched between the first heat-sink layer and the second heat sink layer can efficiently dissipate heat from the laser and can also reduce the HAMR medium surface roughness typically caused by an otherwise overly thick heat-sink layer. Since heat is efficiently dissipated, the associated HAMR laser power may be controlled and reduced. In addition, according to embodiments described herein, the thermal conductivity of the HSBL may be adjusted according to the design selected for the HAMR medium.

In TBLHAMR media, an amorphous underlayer (AUL) may be deposited on the heat-sink layer, which can effectively reduce the roughness as measured by the roughness average (Ra) caused by a relatively thick heat-sink layer. Sputtering with a high bias voltage, for example, of about 300 volts (V) is effective in producing such an AUL. In some of the comparative designs, a 10 nm thick AUL is generally capable of reducing the surface roughness to an acceptable level. However, a thinner AUL, for example, less than 10 nm, shows degradation in performance due to waviness. According to an embodiment, the thickness of the SHSS compared to a corresponding thickness of the heat-sink layer of TBLHAMR medium may be reduced by use of a HSBL with a well-chosen composition and correspondingly well-chosen thermal conductivity so that degradation in performance due to waviness can be abated. According to another embodiment, the composition and crystallographic orientation of the HSBL may be chosen so that degradation in performance due to waviness can also be abated.

The terms "on," "above," "below," and "between" as used herein refer to a relative position of one layer with respect to another layer or other layers. As such, one layer deposited or disposed on, above or below another layer may be directly in contact with the other layer or may have one or more intervening layers that lie between it and the other layer or layers. Moreover, one layer deposited or disposed between layers may be directly in contact with the layers or may have one or more intervening layers that lie between it and the other layer or layers.

It shall be appreciated by those skilled in the art, in view of the present disclosure, that although various example embodiments are discussed herein within the environment of magnetic recording disks, the embodiments, with or without some modifications, may be used for other types of magnetic recording media environments associated with other types of data storage devices, by way of example without limitation thereto, a magneto-optical recording disk for a magneto-optical disk drive, or magnetic recording tape for a magnetic tape drive. It shall be further appreciated by those skilled in the art, in view of the present disclosure, that in lieu of the full names of chemical elements, the well-known symbols for chemical elements may be used herein to designate one or more chemical elements in the interest of brevity and clarity.

Figure 2:
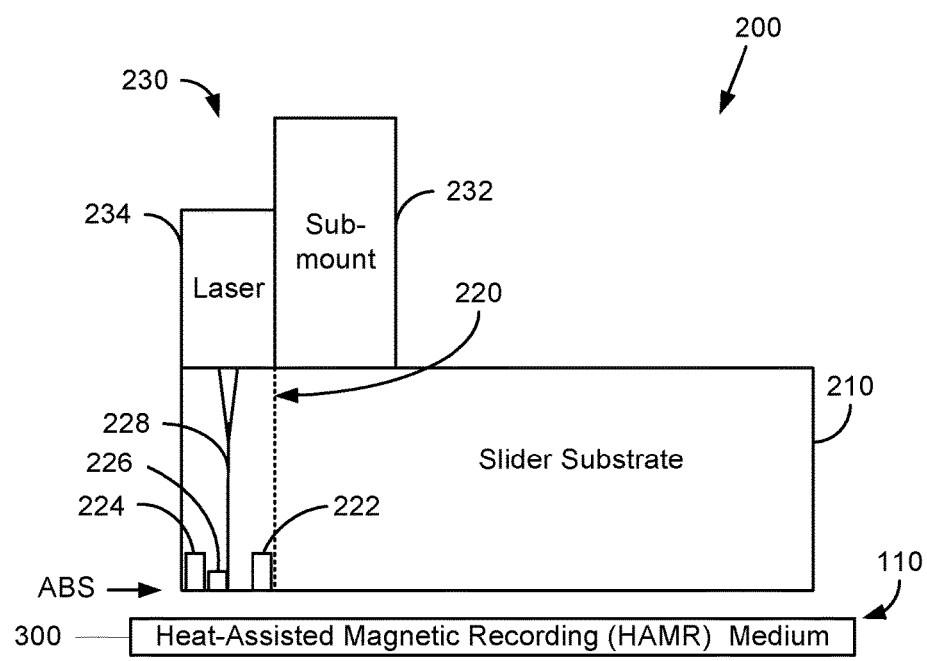
FIG. 2 is a cross-sectional schematic view of selected components of the HAMR data storage device of FIG. 1, showing a HAMR head disposed to write data to, and/or to read data from, the HAMR medium with the SHSS that includes the first heat-sink layer, the HSBL and the second heat-sink layer, according to one embodiment.
Figure 3:
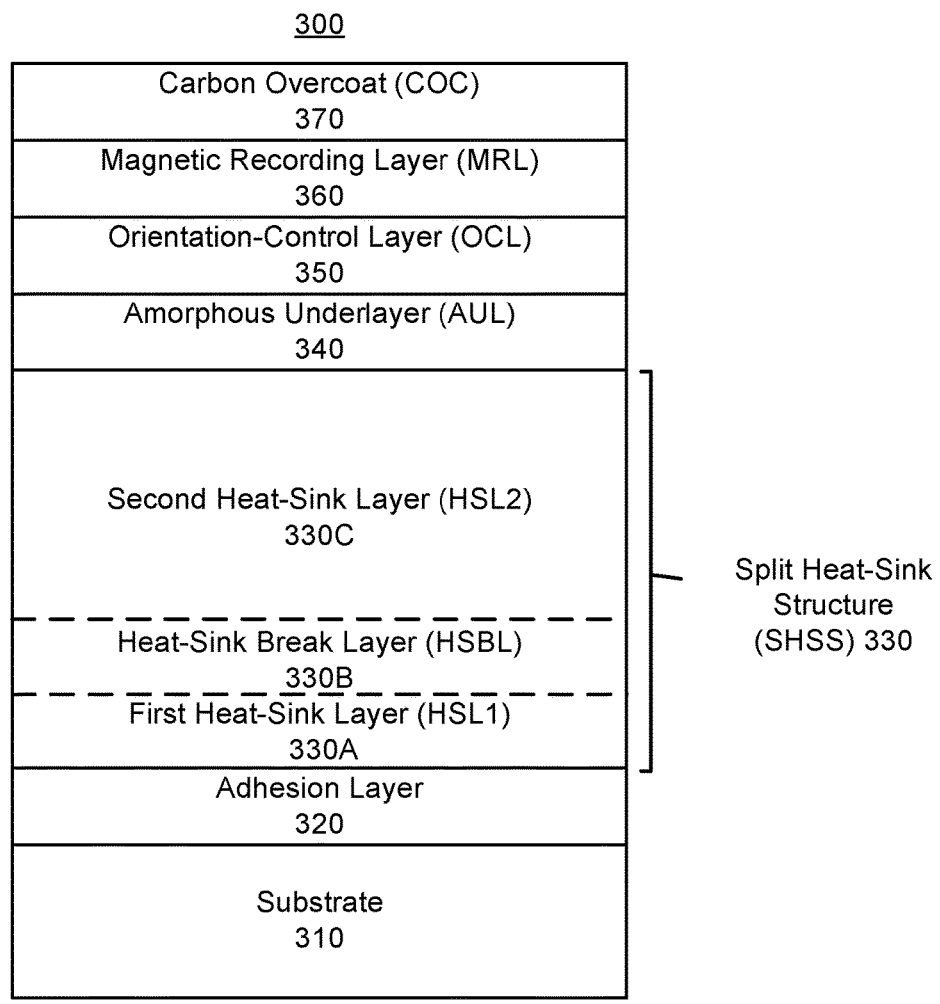
FIG. 3 is cross-sectional view of the HAMR medium with the SHSS that includes the first heat-sink layer, the HSBL and the second heat-sink layer, according to one embodiment.

With reference now to FIG. 1 and FIGS. 2 and 3, according to an embodiment, a schematic drawing is shown of the HAMR data storage device 100, by way of example without limitation thereto, a disk drive configured for HAMR. According to an embodiment, a HAMR medium 300 is incorporated into the HAMR disk 110, and therefore, is also incorporated into HAMR data storage device 100. According to an embodiment, the HAMR data storage device 100 includes at least one HAMR disk 110 and at least one HAMR slider 200 associated therewith. According to an embodiment, the HAMR disk 110 includes the HAMR medium 300 that includes the SHSS 330, including the first heat-sink layer 330A and the second heat sink layer 330C with the HSBL 330B sandwiched between the first heat-sink layer 330A and the second heat sink layer 330C (see e.g., FIG. 3). The HAMR disk 110 is disposed on a spindle assembly 150 that is mounted in a base 160 of a disk enclosure. Data may be stored in a magnetic recording layer 360 (FIG. 3) along tracks (not shown) of the HAMR disk 110. According to an embodiment, the HAMR slider 200 includes a HAMR head 220 (not shown in FIG. 1 but see FIG. 2) that is configured to store, as well as to retrieve, such data. According to an embodiment, the HAMR slider 200 is configured to fly over the HAMR disk 110 to reach a track where data is to be stored and/or retrieved. According to an embodiment, the HAMR head 220 includes a read element 222 and a write element 224 (not shown in FIG. 1 but see FIG. 2). According to an embodiment, the HAMR head 220 may have a magneto-resistive (MR) sensor, a giant magneto-resistive (GMR) sensor, or a tunneling magneto-resistive (TMR) sensor, as a read element 222. The write element 224 is configured to write data to the HAMR disk 110 in a track where data is to be stored with the aid of a NFT 226 supplied with light from a laser 234 by means of a waveguide (WG) 228 (not shown in FIG. 1 but see FIG. 2); and, the read element 222 is configured to read data from the HAMR disk 110 from a track where data has been stored.

With further reference to FIGS. 1-3, according to an embodiment, HAMR slider 200 is disposed at the distal end of an actuator arm 135 of an actuator 130. The radial position of the HAMR slider 200 relative to the HAMR disk 110 may be controlled by position control circuitry 140, which controls the actuator 130 and, thereby, the radial position of the actuator arm 135 and HAMR slider 200 over a particular track of the HAMR disk 110. The HAMR data storage device 100 also includes a spindle motor (not shown) that rotates the spindle assembly 150 and, thereby, the HAMR disk 110 to position a portion of the track under the HAMR slider 200 at a particular circumferential location where data is to be recorded on, or retrieved from, the HAMR disk 110. According to an embodiment, the HAMR data storage device 100 may be, by way of example without limitation thereto, a hard-disk drive (HDD) that includes the various components of the HAMR data storage device 100 described above. Although only a single HAMR disk 110 and a single HAMR slider 200 are shown in FIG. 1, the HAMR data storage device 100 may include a plurality of HAMR disks 110 and a plurality of HAMR sliders 200, and corresponding pluralities of matching components, similar to those described above, to store and/or to retrieve data. Also, other components of the HAMR data storage device 100 that are generally known in the art and not necessary for understanding FIG. 1, have been omitted for conciseness and clarity from the drawing of FIG. 1 and the preceding description, but may be considered to be within the scope of embodiments.

With reference now to FIG. 2 and FIGS. 1 and 3, according to an embodiment, a cross-sectional schematic view is shown of selected components of the HAMR data storage device 100 of FIG. 1, viz., the HAMR slider 200 and the HAMR medium 300. For clarity, FIG. 2 is not to scale. For simplicity not all portions of the HAMR data storage device 100 are shown. Additional and/or different components may be included in the HAMR data storage device 100. As shown in FIG. 2, the HAMR slider 200 includes the slider substrate 210, the HAMR head 220, and the chip-on-submount assembly (COSA) 230. The HAMR medium 300 may be incorporated into a HAMR disk 110. The COSA 230 includes a submount 232 and a laser 234. The submount 232 is a block of material to which the laser 234 may be affixed for improved mechanical stability, ease of manufacturing and better robustness. The laser 234 may be a chip such as a laser diode. As further shown in FIG. 2, by way of example, according to an embodiment, without limitation thereto, portions of COSA 230, the laser 234 and the submount 232, are disposed on the HAMR head 220 and the slider substrate 210, respectively; but, variations in the precise location of the laser 234 and the submount 232 affecting the relative position of the laser 234 and the submount 232 with respect to HAMR head 220 and the slider substrate 210 are also within the scope of embodiments. According to one embodiment, by way of example without limitation thereto, the laser 234 is disposed on the HAMR head 220; and, the laser 234 is configured to raise the temperature of the HAMR medium 300 to reduce the coercivity, $H_c$, thereof at a location on the HAMR disk 110 whereat the write element 224 writes data.

With further reference to FIGS. 1-3, according to an embodiment, the HAMR head 220 is fabricated on the slider substrate 210 and includes an air-bearing surface (ABS) that is disposed proximately to the HAMR medium 300 during magnetic recording. In general, the HAMR head 220 includes a write element 224 and a read element 222. The HAMR head 220 also includes a waveguide (WG) 228 and a near-field transducer (NFT) 226. WG 228 guides light from the laser 234 to the NFT 226, which may be disposed in proximity to the ABS. The NFT 226 utilizes local resonances in surface plasmons to direct the light conveyed to the NFT 226 by WG 228 from the laser 234 into an optical spot localized on the surface of the HAMR medium 300. At resonance, the NFT 226 couples the optical energy of the surface plasmons efficiently into the HAMR medium 300 within a confined optical spot, which is much smaller than the optical diffraction limit determined by the wavelength of the light. This optical spot can rapidly heat a region of the HAMR medium 300 to near or above the Curie point of the magnetic recording layer 360 (not shown in FIG. 1-2, but see FIG. 3). Bits can be written on the HAMR medium 300 at high AD wherein a high coercivity, $H_c$, of the magnetic recording layer 360 is lowered within the optical spot from its value at ambient temperature to a value characteristic of the HAMR medium 300 that is heated within the spot thereby enabling the write element 224 to write data to the magnetic recording layer 360 with a nominal magnetic field characteristic of the magnetic material of the write element 224 when saturated by a write current. The write element 224 is formed of magnetic materials, by way of example without limitation thereto, CoFe, having a high saturation magnetization. Therefore, according to an embodiment, the HAMR medium 300 has utility for the magnetic recording of data at the high ADs used in the HAMR data storage device 100.

With reference now to FIG. 3, according to one embodiment, a cross-sectional view of the HAMR medium 300 with the SHSS 330 that includes the first heat-sink layer 330A and the second heat sink layer 330C with the HSBL 330B sandwiched between the first heat-sink layer 330A and the second heat sink layer 330C is shown. According to an embodiment, the HAMR medium 300 has a stacked structure with a substrate 310 at the base, an adhesion layer 320 disposed on the substrate 310, the SHSS 330 disposed on the adhesion layer 320, an amorphous underlayer (AUL) 340 disposed on the SHSS 330, an orientation-control layer 350 disposed on the AUL 340, a magnetic recording layer 360 disposed on the orientation-control layer 350, and a carbon overcoat (COC) 370 disposed on the magnetic recording layer 360. As used herein, the term, "disposed on," may refer to referenced layer(s) and/or element(s) of the structure of the HAMR medium 300 that are positioned above other layer(s) and/or element(s), for example, as shown in FIG. 3, but may, or may not, be directly in contact with the other layer(s) and/or element(s). The referenced layer(s) and/or element(s) may be so positioned such that one or more intervening layer(s) and/or element(s) may lie between the referenced layer(s) and/or element(s) and the other layer(s) and/or element(s) that the referenced layer(s) and/or element(s) are "disposed on."

With further reference to FIG. 3, according to some embodiments, the adhesion layer 320, the AUL 340, and/or the orientation-control layer 350 may be individually, collectively, or pairwise absent from the structure of HAMR medium 300. According to some embodiments, the COC 370 may be individually absent from the structure of HAMR medium 300. Therefore, according to an embodiment, the magnetic recording medium for heat assisted magnetic recording (HAMR), referred to herein as the HAMR medium 300, includes at least the following: a substrate 310, a SHSS 330 that includes a first heat-sink layer 330A disposed on the substrate 310, a HSBL 330B disposed on the first heat-sink layer 330A and a second heat-sink layer 330C disposed on the HSBL 330B, and a magnetic recording layer 360 disposed on the SHSS 330, without limitation thereto. Thus, according to an embodiment, the HAMR medium may further include the following: the adhesion layer 320 disposed between the substrate 310 and the SHSS 330, an AUL 340 disposed on the SHSS 330, an orientation-control layer 350 disposed between AUL 340 and the magnetic recording layer 370, and the COC 370 disposed on the magnetic recording layer 370. In another embodiment, a layer of lubricant (not shown), also referred to as a "lube layer," may be disposed on the COC 370.

With further reference to FIG. 3, according to some embodiments, the substrate 310 can be made of one or more materials such as an Al alloy, NiP plated Al, glass, glass ceramic, and combinations thereof. In one embodiment, the adhesion layer 320 can include one or more materials such as CrTi, CrTa, NiTa, CoCrTaZr, CoFeZrBCr, CoTaZr, CoFeTaZr, CoCrWTaZr, CoCrMoTaZr, CoZrWMo, and combinations thereof.

With further reference to FIG. 3, according to an embodiment, a trilayer comprising the first heat-sink layer 330A, the HSBL 330B, and the second heat sink layer 330C make up the SHSS 330. According to an embodiment, a thermal resistance of the HSBL 330B is greater than a thermal resistance of the first heat-sink layer 330A, and the thermal resistance of the HSBL 330B is greater than a thermal resistance of the second heat-sink layer 330C. According to an embodiment, the HSBL 330B includes two phases including a first-phase material and a second-phase material, without limitation thereto. According to an embodiment, a thermal conductivity of the first-phase material is greater than a thermal conductivity of the second-phase material. According to an embodiment, the first-phase material may include columnar grains, without limitation thereto. According to an embodiment, the first-phase material may be epitaxially matched to at least one of a first heat-sink material of the first heat-sink layer 330A and a second heat-sink material of the second heat-sink layer 330C, without limitation thereto. According to an embodiment, the HSBL 330B may include a mixture of a first phase and a second phase, wherein the first phase includes a first-phase material including a metallic material, and the second phase includes a second-phase material including a material that is disposed between the grains of the first phase material at the grain-boundaries of the first phase material.

Alternatively, according to another embodiment, the HSBL 330B may include a single phase material, without limitation thereto. According to another embodiment, by choice of the single phase material for the HSBL 330B, the thermal resistance of a first interface between the HSBL 330B and the first heat-sink layer 330A may be made higher than the thermal resistances of the HSBL 330B and the first heat-sink layer 330A, either alone or in combination with one another. Similarly, according to another embodiment, by choice of the single phase material for the HSBL 330B, the thermal resistance of a second interface between the HSBL 330B and the second heat-sink layer 330A may be made higher than the thermal resistances of the HSBL 330B and the second heat-sink layer 330C, either alone or in combination with one another. According to an embodiment, by choice of the single phase material for the HSBL 330B, a combined thermal resistance of the first interface between the HSBL 330B and the first heat-sink layer 330A, of the second interface between the HSBL 330B and the second heat-sink layer 330C, and of the HSBL 330B may be greater than a thermal resistance of the first heat-sink layer 330A, and the second heat-sink layer 330C, either alone or in combination with one another.

Similarly, according to another embodiment, the HSBL 330B that includes at least two phases including a first-phase material and a second-phase material, without limitation thereto, may include more than two phases. By choice of the materials for the respective phases of the HSBL 330B, the thermal resistance of a first interface between the HSBL 330B and the first heat-sink layer 330A may be made higher than the thermal resistances of the HSBL 330B and the first heat-sink layer 330A, either alone or in combination with one another. According to another embodiment, for the HSBL 330B that includes at least two phases including a first-phase material and a second-phase material, without limitation thereto, by choice of the materials for the respective phases of the HSBL 330B, the thermal resistance of a second interface between the HSBL 330B and the second heat-sink layer 330C may be made higher than the thermal resistances of the HSBL 330B and the second heat-sink layer 330C, either alone or in combination with one another. According to an embodiment, by choice of the materials for the respective phases of the HSBL 330B, a combined thermal resistance of the first interface between the HSBL 330B and the first heat-sink layer 330A, of the second interface between the HSBL 330B and the second heat-sink layer 330C, and of the HSBL 330B may be greater than the thermal resistance of the first heat-sink layer 330A, and the second heat-sink layer 330C, either alone or in combination with one another.

With further reference to FIG. 3, according to an embodiment, the first heat-sink layer 330A may be disposed on the adhesion layer 320. According to some embodiments, first heat-sink layer 330A includes a material selected from the group consisting of Ag, Al, Au, Cu, Cr, Mo, Ru, W, CuZr, MoCu, AgPd, CrRu, CrV, CrW, CrMo, CrNd, NiAl, NiTa, and combinations thereof. According to an embodiment, the HSBL 330B is disposed on the first heat-sink layer 330A. According to an embodiment, the HSBL may include CoX, Co being a first constituent, wherein X is a second constituent selected from the group consisting of Cr, Pt, Ag, Ru and combinations thereof. According to another embodiment, the HSBL may include two phases, wherein a first phase material includes the CoX as described above and a second phase material includes a third constituent, Y, selected from the group consisting of $SiO_2$, $SiO_x$, MgO, $Cr_2O_3$, $CrO_x$, $HfO_2$, $ZrO_2$, $TiO_2$, $TiO_x$, $Ta_2O_5$, $TaO_x$, $WO_3$, $WO_x$, and combinations thereof. As used herein, note that "Y" does not refer to the element Yttrium, but rather to one of the species of third constituents listed above. Thus, according to embodiments, the HSBL 330B may include CoXY, Co being the first constituent, wherein X is a second constituent selected from the group consisting of Cr, Pt, Ag, Ru and combinations thereof, and Y is a third constituent selected from the group consisting of $SiO_2$, $SiO_x$, MgO, $Cr_2O_3$, $CrO_x$, $HfO_2$, $ZrO_2$, $TiO_2$, $TiO_x$, $Ta_2O_5$, $TaO_x$, $WO_3$, $WO_x$, and combinations thereof. Note that the lower-case subscript, "x," denotes an arbitrary amount of oxygen in an oxide compound, not necessarily a stoichiometric value, which might be produced in, for example, a thin-film deposition process, such as sputtering without limitation thereto. According to an embodiment, the second heat-sink layer 330C is disposed on the HSBL 330B. According to some embodiments, second heat-sink layer 330C includes a material selected from the group consisting of Ag, Al, Au, Cu, Cr, Mo, Ru, W, CuZr, MoCu, AgPd, CrRu, CrV, CrW, CrMo, CrNd, NiAl, NiTa, and combinations thereof.

With further reference to FIG. 3, according to an embodiment, the CoX portion of the HSBL 330B has a substantially hexagonal close-packed (HCP) crystal structure, and a (0002) preferred orientation. The (0002) preferred orientation of the CoX portion of the HSBL 330B can serve as an epitaxial template for the material of the second heat-sink layer 330C, for example, HCP ruthenium (Ru), for growth of the second heat-sink layer 330C with a (0002) preferred orientation. Therefore, in one embodiment, the first heat-sink layer and the second heat-sink layer may include Ru, and the HSBL may include a material selected from the group consisting of $CoCrSiO_2$, $CoPtSiO_2$, $CoAgSiO_2$, $CoRuSiO_2$, $CoCrTiO_2$, $CoPtTiO_2$, $CoAgTiO_2$, $CoRuTiO_2$, CoCr, CoPt, CoAg, and CoRu. According to an embodiment, the material of the HSBL 330B may be selected to support the heteroepitaxial growth of the material of the second heat-sink layer 330C disposed on top of the HSBL 330B, by way of example without limitation thereto, Ru. Therefore, more generally within the scope of embodiments, the functionality of the HSBL 330B may be extended to other heat-sink material systems, by way of example without limitation thereto, an SHSS 330 including a first heat-sink layer 330A, an HSBL 330B, and a second heat-sink layer 330C, wherein the first heat-sink material of the first heat-sink layer 330A and the second heat-sink material of the second heat-sink layer 330C are different heat sink materials with different thermal conductivities.

With further reference to FIG. 3, according to an embodiment, a thickness of the first heat-sink layer 330A is between about 5 nanometers (nm) to about 50 nm, a thickness of the HSBL 330B is between about 1 nm to about 10 nm, and a thickness of the second heat-sink layer 330C is between about 50 nm to about 100 nm. Alternatively, in another embodiment, a thickness of the first heat-sink layer 330A is between about 50 nm to about 100 nm, a thickness of the HSBL 330B is between about 1 nm to about 10 nm, and a thickness of the second heat-sink layer 330C is between about 5 nm to about 50 nm.

With further reference to FIG. 3, in several embodiments, the AUL 340 can include one or more materials such as CrTiZ, CrTaZ, NiTaZ, CoCrTaZrZ, CoFeZrBCrZ, CoTaZrZ, CoFeTaZrZ, CoCrWTaZrZ, CoCrMoTaZrZ, CoZrWMoZ, and combinations thereof, wherein, if Z is present, Z can be a specific constituent that is one of either SiO2 or ZrO2. In another embodiment, the AUL 340 can include one or more materials such as CrTi, CrTa, NiTa, CoCrTaZr, CoFeZrBCr, CoTaZr, CoFeTaZr, CoCrWTaZr, CoCrMoTaZr, CoZrWMo, and combinations thereof, without the specific constituent Z, as recited above. In an embodiment, the AUL 340 may have a thickness of about 10 nm, having an amorphous, non-crystalline microstructure, which prevents the second heat-sink layer 330C of the SHSS 330, which may have relatively larger grain size, for example, for second heat-sink layer 330C including a relatively thick Ru layer of about 60 nm to about 70 nm, from acting as a seed layer for the growth of the orientation-control layer 350. In one embodiment, the orientation-control layer 350 can be made of one or more materials such as Cr, Mo, NiAl, MgO, MgTiO, MgOC, MgTiON, TiC, TiN, Ag, CrMo, Pt, Pd, Ru, and combinations thereof. In an embodiment, the orientation-control layer 350 may comprise MgO having a thickness of about 4 nm, and having the halite structure with an (001) preferred orientation. In one embodiment, the magnetic recording layer 360 can be made of one or more materials such as FePt, FePd, CoPt, and combinations thereof. According to embodiments, the constituents Ag, Cu, B, C, N and $SiO_2$, without limitation thereto, may serve as segregants that migrate to the grain boundaries of the grains of the magnetic recording layer 360, so as to magnetically decouple neighboring grains in the magnetic recording layer 360 to support high AD magnetic recording therein. In another embodiment, the magnetic recording layer 360 may be capped with a capping layer (not shown) comprising Co. In an embodiment, the combined total thickness of a magnetic recording layer 360 and the capping layer may be about 10 nm, and the magnetic recording layer 360 includes a material having an ordered L1o structure with a substantially (002) preferred orientation, for example, FePt and/or CoPt, without limitation thereto. In another embodiment, the COC 370 that is disposed on the magnetic recording layer 360 may be diamond-like carbon (DLC), without limitation thereto. In another embodiment, the COC 370 may have a thickness of from about 1.5 nm to about 4 nm, where a COC 370 with a thickness of between 1.5 nm to about 2 nm may allow for improved magnetic recording density compared to a thicker COC 370.

With further reference to FIGS. 1-3, according to an embodiment, the HAMR medium 300 may be incorporated into a HAMR disk 110. According to another embodiment, the HAMR medium 300 may be incorporated into the HAMR data storage device 100. According to an embodiment, the HAMR data storage device 100 includes: a HAMR disk 110 that includes the HAMR medium 300, a HAMR slider 200 including a slider substrate 210 and configured to fly over the HAMR disk 110, and the HAMR head 220 disposed on the slider substrate 210, and a laser 234 disposed on the slider substrate 210. According to an embodiment, the HAMR head 220 includes a write element 224 configured to write data to the HAMR disk 110, and a read element 222 configured to read data from the HAMR disk 110. According to an embodiment, the laser 234 is configured to raise the temperature of the HAMR medium 300 to reduce the coercivity, $H_c$, thereof at a location on the HAMR disk 110 whereat the write element 224 writes data. According to an embodiment, the HAMR data storage device 100 may be a hard-disk drive (HDD), without limitation thereto.

With further reference to FIG. 3, the HAMR medium 300 may be compared with an example TBLHAMR medium that utilizes a TBL. The example TBLHAMR medium does not include the SHSS 330; but, according to an embodiment, the HAMR medium 300 includes the SHSS 330 that includes the first heat-sink layer 330A and the second heat sink layer 330C with the HSBL 330B sandwiched between the first heat-sink layer 330A and the second heat sink layer 330C. Throughout the following discussion, the names of various layers in the respective structures of the example TBLHAMR medium and the HAMR medium 300 have at times been given acronyms for brevity and clarity. Also, since some of the elements, for example, layers, in the respective structures have the same name, note that elements without reference numbers refer to the structure of the example TBLHAMR medium, in general (excepting a capping layer of an alternative embodiment for HAMR medium 300, not shown in FIG. 3, by way of example without limitation thereto), whereas elements with reference numbers refer to embodiments of the structure of HAMR medium 300. The example TBLHAMR medium includes a substrate at the base, an adhesion layer disposed on the substrate, a heat-sink layer disposed on the adhesion layer, a TBL disposed on the heat-sink layer, an AUL disposed on the heat-sink layer, an orientation-control layer (OCL) disposed on the AUL, a magnetic recording layer (MRL) disposed on the OCL, a capping layer (CL) disposed on the MRL, and a carbon overcoat (COC) disposed on the CL. In contrast, according to an embodiment, as shown in FIG. 3, the HAMR medium 300 may include the substrate 310 at the base, an adhesion layer 320 disposed on the substrate 310, the SHSS 330 disposed on the adhesion layer 320, an AUL 340 disposed on the SHSS 330, an OCL 350 disposed on the AUL 340, a MRL 360 disposed on the OCL 350, a COC 370 disposed on the MRL 360, and in an alternative embodiment, a capping layer (CL) (not shown) may be disposed on the MRL between the MRL 360 and the COC 370. According to an embodiment, the SHSS 330 includes a first heat-sink 330A disposed on the substrate 310, a HSBL 330B disposed on the first heat-sink layer 330A, and a second heat-sink layer 330C disposed on HSBL 330B.

A typical stack of the example TBLHAMR medium consists of the adhesion layer, the heat-sink layer to control the thermal response of the example TBLHAMR medium, the AUL, the OCL comprising a MgO seedlayer to serve as an epitaxial template for the growth of the MRL, the MRL comprising a granular FePt, and a thermally stable COC. The example TBLHAMR medium also incorporates the TBL comprising an oxide with low thermal conductivity sandwiched between the heat-sink layer and the AUL. Use of the example TBLHAMR medium enables laser power reduction with minimal SNR loss. The heat-sink layer of the TBLHAMR medium comprises a Ru film that is from about 100 nm to 120 nm thick; and the TBL comprises a thin film composed of $Y_2O_3$ doped $ZrO_2$ that is about 2 nm thick. Alternatively, other oxide materials, such as, $SiO_2$ and $HfO_2$, might also be used for the TBL.

The overall thickness of the stacked structure of the HAMR medium 300 is substantially thinner than the stacked structure of the example TBLHAMR medium, because of the absence of the TBL and reduced thickness of the SHSS 330 in the stacked structure of the HAMR medium 300 compared to the thickness of the heat-sink layer in the stacked structure of the TBLHAMR medium. Also, since the HAMR medium 300 lacks the TBL, according to an embodiment, the SHSS 330 is configured to enable use of a about 20% thinner SHSS 330 compared to the thickness of the heat-sink layer in the stacked structure of the TBLHAMR medium that allows use of a reduced operating current of the laser 234 while maintaining about the same write performance properties as the example TBLHAMR medium that includes the TBL and the thicker heat-sink layer. Therefore, according to an embodiment, the SHSS 330 is configured to enable use of the SHSS 330 that is about 80% of a thickness of a corresponding heat-sink layer of the TBLHAMR medium that includes the TBL, and the SHSS 330 is configured to enable use of a reduced operating current of the laser 234 compared to a corresponding operating current of a corresponding laser of a TBLHAMR data storage device, such that write performance properties of the HAMR medium 300 written with the reduced operating current of the laser 234 are substantially the same as corresponding write performance properties of the TBLHAMR medium, wherein in all other respects, excepting the substitution of the HAMR medium 300 for the TBLHAMR medium data storage, the TBLHAMR data storage device is substantially the same as the HAMR data storage device 100. According to one embodiment, the thickness of the SHSS 330 is from about 66 nm to about 86 nm, which is less than about 100 nm to about 120 nm, which is the thickness of the heat-sink layer of the TBLHAMR medium. Therefore, according to an embodiment, for HAMR medium 300, since the TBL is absent from the structure of the HAMR medium 300, and a thin SHSS 330, including the first heat-sink layer 330A and the second heat-sink layer 330C comprising Ru and HSBL 330B comprising a material CoXY, Co being a first constituent, wherein X is a second constituent selected from the group consisting of Cr, Pt, Ag, Ru and combinations thereof, and Y is a third constituent selected from the group consisting of $SiO_2$, $SiO_x$, MgO, $Cr_2O_3$, $CrO_x$, $HfO_2$, $ZrO_2$, $TiO_2$, $TiO_x$, $Ta_2O_5$, $TaO_x$, $WO_3$, $WO_x$, and combinations thereof, is inserted between the adhesion layer 320 and the AUL 340, the thickness of the SHSS 330 could be reduced to about 80% of the thickness of the corresponding heat-sink layer of the TBLHAMR medium. According to an embodiment, the added second and third constituents X and/or Y, respectively, also permit the engineering of the thermal resistance of CoXY of the HSBL 330B such that the thermal resistance of SHSS 330 has a value greater than the combined thermal resistance of the corresponding heat-sink layer and TBL of the TBLHAMR medium.

Moreover, according to an embodiment, as a result of the reduced thickness of the stacked structure of the HAMR medium 300 and the absence of the TBL from the structure of the HAMR medium 300, the roughness of the top of the SHSS 330 of the HAMR medium 300 is substantially less than the roughness of the heat-sink layer of the example TBLHAMR medium. Furthermore, for the example TBLHAMR medium, since the roughness of the heat-sink layer (HSL) comprising Ru increases with thickness, which manifests itself in long range waviness of HSL/TBL/AUL interfaces (note that each slash symbol denotes an interface), there are adverse effects on the crystallographic orientation of the OCL comprising MgO, and consequently on the crystallographic orientation of the MRL comprising FePt, for which the OCL provides an epitaxial template. To overcome the waviness, for the example TBLHAMR medium, a thick AUL may be used, often at the expense of poorer thermal gradient of the example TBLHAMR medium, which adversely affects linear density of data recorded in the MRL of the example TBLHAMR medium. Therefore, embodiments of HAMR medium 300, as shown in FIG. 3, considerably improve the quality of the HSL 340/AUL 340 interface by reducing the waviness thereof in comparison with the waviness of the HSL/TBL/AUL interfaces of the example TBLHAMR medium, which can translate into improved linear density of data recorded in the MRL 360 of HAMR medium 300, when compared with the MRL of the example TBLHAMR medium.

Figure 4:
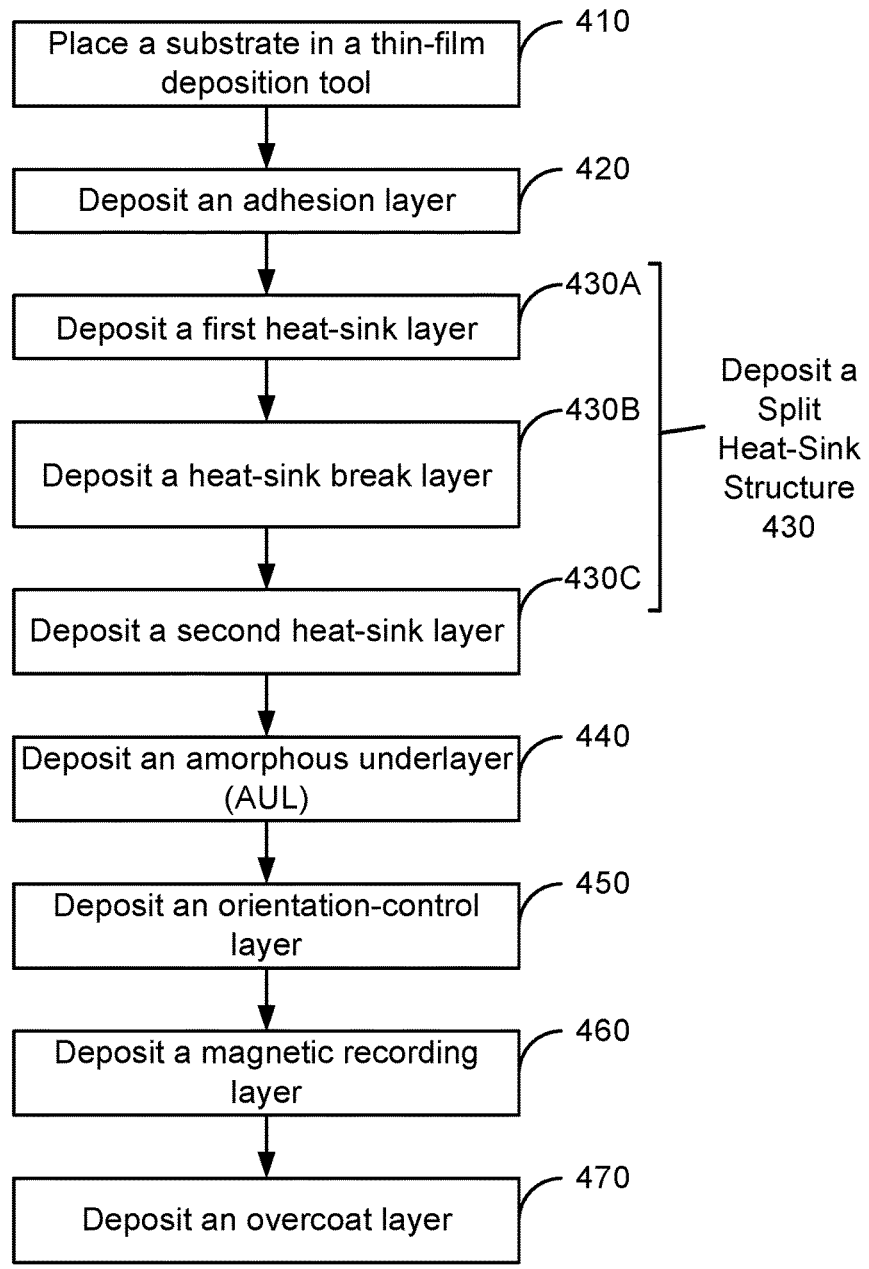
FIG. 4 is a flowchart of a process for manufacturing the HAMR medium with the SHSS that includes the first heat-sink layer, the HSBL and the second heat-sink layer, according to one embodiment.

With reference now to FIG. 4, according to one embodiment, a flowchart of a method 400 for manufacturing the HAMR medium 300 including a SHSS 330 that includes the first heat-sink layer 330A and the second heat sink layer 330C with the HSBL 330B sandwiched between the first heat-sink layer 330A and the second heat sink layer 330C is shown. In particular embodiments, the method 400 can be used to manufacture the HAMR medium 300 of FIGS. 1-3. As used in the following description of the method 400 and herein, the term, "deposited on," "depositing on," or "deposit on," may refer to referenced layer(s) and/or element(s) of the structure of the HAMR medium 300 that are formed above other layer(s) and/or element(s), for example, as shown in FIG. 3, but may, or may not, be directly in contact with the other layer(s) and/or element(s). The referenced layer(s) and/or element(s) may be so formed such that one or more intervening layer(s) and/or element(s) may lie between the referenced layer(s) and/or element(s) and the other layer(s) and/or element(s) that the referenced layer(s) and/or element(s) are "deposited on." At 410, according to an embodiment, the substrate 310 is placed in a thin-film deposition tool. At 430, according to an embodiment, a SHSS 330 is deposited that includes, at 430A, depositing first heat-sink layer 330A on the substrate 310, and at 430B, depositing the HSBL 330B deposited on the first heat-sink layer 330A, and at 430C, depositing second heat-sink layer 330C on the HSBL 330B. At 460, according to an embodiment, the magnetic recording layer 360 is deposited on the SHSS 330.

In a number of embodiments, the method 400 can manufacture the layers of the HAMR medium 300 with any of the numerous variations described above for the embodiments of FIGS. 1-3. For example, in one such case, the method 400 can also provide the adhesion layer 320 disposed between the substrate 310 and the first heat-sink layer 330A, the AUL 340 disposed on the SHSS 330, the orientation-control layer 350 disposed between the AUL 340 and the magnetic recording layer 360, and the COC 370 disposed on the magnetic recording layer 370. Therefore, at 420, according to an embodiment, the adhesion layer 320 is deposited on the substrate 310; at 440, according to an embodiment, the AUL 340 is deposited on the SHSS 330; at 450, according to an embodiment, the orientation-control layer 350 is deposited on the AUL 340; and, at 470, according to an embodiment, the COC 370 is deposited on the magnetic recording layer 360. In several embodiments, the layers can include the materials as described above.

In some embodiments, the method 400 deposits the HSBL 330B by applying a bias voltage of about −50V to −450V applied to the substrate. In another embodiment, the HSBL 330B is deposited by direct-current (DC) sputtering at a pressure of less than 10 milliTorr (mTorr) in an atmosphere selected from the group consisting of Argon (Ar) gas and a mixture of Ar gas and nitrogen gas, $N_2$, the mixture determined by a flow rate of $N_2$ gas of between about 2% to 10% of the total combined gas flow rate of Ar and $N_2$ gases together. In another embodiment, the CoX portion of the HSBL 330B is deposited to have a substantially hexagonal close-packed (HCP) crystal structure, and a (0002) preferred orientation. In another embodiment, if the first and/or second heat-sink layers 330A and 330C, respectively, are composed of Ru, the Ru is deposited to have a substantially hexagonal close-packed (HCP) crystal structure, and a (0002) preferred orientation. Alternatively, in another embodiment, if the first and/or second heat-sink layers 330A and 330C, respectively, are composed of a material selected from the group consisting of Ag, Al, Au, and Cu, the Ag, Al, Au, and/or Cu is deposited to have a substantially face-centered cubic (FCC) crystal structure, and a (111) preferred orientation. Alternatively, in another embodiment, if the first and/or second heat-sink layers 330A and 330C, respectively, are composed of a material selected from the group consisting of Cr, Mo, W, CrV, CrW, and CrMo, the Cr, Mo, W, CrV, CrW, and/or CrMo is deposited to have a substantially body-centered cubic (BCC) crystal structure, and a (200) preferred orientation.

With further reference to FIGS. 4 and 3, in another embodiment, the material and/or materials selected for the HSBL 330B alone, or in concert with one another, is/are deposited providing an epitaxial template for the subsequent growth of the material of the second heat-sink layer 330C. According to an embodiment, HSBL 330B may include a mixture of a first phase and a second phase, wherein the first phase includes a first-phase material including a metallic material with a columnar-grain structure, and the second phase includes a second-phase material including a material that is disposed between the grains of the first phase material at the grain-boundaries of the first phase material. According to an embodiment, the first-phase material of HSBL 330B may be epitaxially matched to at least one of a first heat-sink material of the first heat-sink layer 330A and a second heat-sink material of the second heat-sink layer 330C. Alternatively, in another embodiment, HSBL 330B may include a single phase material. According to an embodiment, the single phase material of HSBL 330B may be epitaxially matched to at least one of a first heat-sink material of the first heat-sink layer 330A and a second heat-sink material of the second heat-sink layer 330C.

In one embodiment, the process can perform the sequence of actions in a different order. In another embodiment, the process can skip one or more of the actions. In other embodiments, one or more of the actions are performed simultaneously. In some embodiments, additional actions can be performed.

In addition, a study comparing the magnetic recording performance properties of the HAMR medium 300 with the magnetic recording performance properties of the TBLHAMR medium was performed. The initial weighted-sum SNR (wsSNRinitial), final weighted-sum SNR (wsSNRfinal), DC-SNR and jitter of the HAMR medium 300 with an HSBL 330B composed of the material $CoCrSiO_2$ were measured as a function of the laser current. Similarly, wsSNRinitial, wsSNRfinal, DC-SNR and jitter of the TBLHAMR medium were also measured as a function of the laser current. The respective values of these magnetic recording performance properties of the HAMR medium 300 with an HSBL 330B composed of the material $CoCrSiO_2$ and the TBLHAMR medium with the TBL composed of the material $ZrO_2$ were then compared. (Note that the wsSNRfinal denotes a measurement of the wsSNR, after tracks adjacent to the track on which wsSNR measurement is made have been repeatedly written a number of times, in the present example, about ten times; the side writing from adjacent tracks degrades the signal from the track in between, which is reflected in a lower value of the wsSNRfinal compared to a wsSNRinital from a track without adjacently written tracks.) The HAMR medium 300 had the following structure: the thickness of the HSBL 330B composed of $CoCrSiO_2$ was about 1 nm; the thickness of the first heat-sink layer 330A composed of Ru was about 10 nm; and, the thickness of the second heat-sink layer 330C composed of Ru was about 70 nm. The TBLHAMR medium had the following structure: the thickness of the TBL 330B composed of $ZrO_2$ was about 2 nm; the thickness of heat-sink layer composed of Ru was about 100 nm. In all other respects, the remaining structure of the HAMR medium 300 and the TBLHAMR medium were essentially the same in composition, as well as thickness, viz.: about 14 nm of AUL, about 5 nm of OCL, about 10 nm of MRL, and about 5 nm of COC. Compared to the TBLHAMR medium, the HAMR medium 300 with an HSBL 330B composed of the material $CoCrSiO_2$ demonstrated: higher wsSNRinitial by about 0.1 dB, viz., about 12.3 dB compared with about 12.2 dB; higher wsSNRfinal by about 0.2 dB, viz., about 11.1 dB compared with about 10.9 dB; higher DC-SNR by about 0.5 dB, viz., about 22.3 dB compared with about 21.8 dB; and, similar jitter, about 2.67 nm for both. The laser current used to write the HAMR medium 300 with an HSBL 330B composed of the material $CoCrSiO_2$ was lower by 1.5 mAmperes (mA), at about 46.5 mA compared with about 48 mA for the TBLHAMR medium.

In addition, wsSNRinitial, wsSNRfinal, DC-SNR and jitter of the HAMR medium 300 were studied as a function of the thickness of the HSBL 330B composed of $CoCrSiO_2$. In the range of thickness from about 1 nm to about 5 nm, the magnetic recording performance properties show little or no dependence on the thickness of the HSBL 330B composed of $CoCrSiO_2$. From about 5 to about 10 nm in the thickness of the HSBL 330B, there is slight degradation in SNR and increase in jitter. This result indicates that the recording performance is not strongly sensitive to the thickness of the HSBL 330B, which allows for wider margin in the manufacturing process.

In addition, a study comparing the crystallographic texture of the magnetic recording layers of the HAMR medium 300 including a HSBL 330B composed of $CoCrSiO_2$ with the crystallographic texture of the example TBLHAMR medium including the TBL composed of $ZrO_2$ was made. The crystallographic textures of the magnetic recording layer 360 of the HAMR medium 300 including a HSBL 330B composed of $CoCrSiO_2$ and the magnetic recording layer of the example TBLHAMR medium including the TBL composed of $ZrO_2$ were quantified by measuring with X-ray diffraction (XRD) the FePt (002) reflections from the respective media using the Bragg-Brentano, theta-2theta ($\theta$-$2\theta$) configuration to produce XRD diffractometer scans. The integrated peak intensities from the XRD diffractometer scans of FePt (002) reflections of the HAMR medium 300 including a HSBL 330B composed of $CoCrSiO_2$ and the example TBLHAMR medium including the TBL composed of $ZrO_2$ were found to be 1660 counts-per-second degree (cps deg) and 1433 cps deg, respectively. This suggested that the magnetic recording layer of the HAMR medium 300 including a HSBL 330B composed of $CoCrSiO_2$ had a stronger crystallographic texture than the crystallographic texture of the magnetic recording layer of the example TBLHAMR medium including the TBL composed of $ZrO_2$. In addition, the full-width at half maximums (FWHMs) of FePt (002) reflections of the HAMR medium 300 including a HSBL 330B composed of $CoCrSiO_2$ and the example TBLHAMR medium including the TBL composed of $ZrO_2$ were measured from X-ray rocking curves at about 6.31° and about 6.75°, respectively. Thus, the FWHM of the FePt (002) reflection of the HAMR medium 300 including a HSBL 330B composed of $CoCrSiO_2$ was about 0.4° less than the FWHM of the FePt (002) reflection of the example TBLHAMR medium including the TBL composed of $ZrO_2$. Therefore, the crystallographic texture of the magnetic recording layer of the HAMR medium 300 including a HSBL 330B composed of $CoCrSiO_2$ is more pronounced than the crystallographic texture of the magnetic recording layer of the example TBLHAMR medium including the TBL composed of $ZrO_2$.

A study comparing the surface roughness of the HAMR medium 300 including a HSBL 330B composed of $CoCrSiO_2$ with the surface roughness of the example TBLHAMR medium including the TBL composed of $ZrO_2$ was also made. The roughness average (Ra) and peak roughness (Rp) were measured at about the middle diameters of magnetic recording disks that incorporated the respective media. The Rp of the HAMR medium 300 including a HSBL 330B composed of $CoCrSiO_2$ was found to be 20.5 angstroms (Å) compared to a value of 20.9 Å for the example TBLHAMR medium including the TBL composed of $ZrO_2$. The Ra of the HAMR medium 300 including a HSBL 330B composed of $CoCrSiO_2$ was found to be 5.69 Å compared to a value of 5.94 Å for the example TBLHAMR medium including the TBL composed of $ZrO_2$. Thus, the surface roughness, as measured by both Ra and Rp, of the HAMR medium 300 including a HSBL 330B composed of $CoCrSiO_2$ was less than surface roughness of the example TBLHAMR medium including the TBL composed of $ZrO_2$.

Cross-sectional scanning transmission electron microscopy (STEM) was performed to investigate the origin of the lessened surface roughness and the more pronounced crystallographic texture of the HAMR medium 300 including the HSBL 330B composed of $CoCrSiO_2$ compared to that of the example TBLHAMR medium including the TBL composed of $ZrO_2$. When comparing micrographs detailing the structure of the HSL/TBL/AUL interfaces of the example TBLHAMR medium including the TBL composed of $ZrO_2$ with the structure of the HSL 340/AUL 340 interface of HAMR medium 300 including a HSBL 330B composed of $CoCrSiO_2$, it was found that HSL/TBL/AUL interfaces were substantially wavier than the HSL 340/AUL 340 interface. This is explained by the reduced thickness of SHSS 330 of the HAMR medium 300 including a HSBL 330B composed of $CoCrSiO_2$ compared to the combined thickness of the heat-sink layer and TBL of the example TBLHAMR medium including the TBL composed of $ZrO_2$, as surface roughness might be expected to increase with increasing thickness of the thin-film deposits of the heat-sink layer and the TBL of the TBLHAMR medium.

Aside from the reduction of surface roughness of the HAMR medium 300, there is also a cost-savings realized by the method of making the SHSS 330 of the HAMR medium. The TBL composed of $ZrO_2$ of the TBHAMR medium uses RF sputtering whereas $CoCrSiO_2$ of HSBL 330 of the HAMR medium 300 uses DC sputtering. RF-sputtering power supplies are three times more expensive than DC-sputtering power supplies, viz.: as of about the time of writing, about $500,000 USD vs. about $150,000 USD, respectively. Therefore, considerably less capital expenditure inures to the benefit of manufacturing a HAMR disk 110 that incorporates the HAMR medium 300 including a HSBL 330B, for example, composed of $CoCrSiO_2$. Moreover, the use of thinner Ru heat-sink layers, the first heat-sink layer 330A and the second heat-sink layer 330C, of SHSS 330 of the HAMR medium 300, apart from improving manufacturing throughput, also reduces material costs, as less Ru is used in the thinner SHSS 330.

In addition to the embodiments described above for the SHSS 330 of HAMR medium 300, other embodiments for the SHSS 330 not described above are also within the scope of embodiments. By way of example without limitation thereto, utilizing high thermal-conductivity heat-sink materials in the SHSS 330 as two different heat-sink materials with different thermal conductivities for the first heat-sink layer 330A and the second heat-sink layer 330C, respectively, are also within the scope of embodiments. However, according to other embodiments, a certain degree of lattice matching between layers of the SHSS 330 would be used to provide for the heteroepitaxial growth of the each layer on the layer beneath it.

While the above description contains many specific embodiments, these are not to be construed as limitations on the scope of the embodiments, but rather as examples of specific embodiments. Accordingly, the scope of the embodiments is not to be determined by the specific embodiments illustrated, but by the appended claims and their equivalents.

For example, in several embodiments, the deposition of such layers can be performed using a variety of deposition processes, including, but not limited to physical vapor deposition (PVD), sputter deposition and ion beam deposition, and chemical vapor deposition (CVD) including plasma enhanced chemical vapor deposition (PECVD), low pressure chemical vapor deposition (LPCVD) and atomic layer chemical vapor deposition (ALCVD). In other embodiments, other deposition techniques known in the art may also be used.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences. For example, described tasks or events may be performed in an order other than that specifically disclosed, or multiple tasks or events may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A heat-assisted magnetic recording (HAMR) medium, comprising:
    a substrate;
    a split heat-sink structure (SHSS), comprising:
        a first heat-sink layer disposed on the substrate;
        a heat-sink break layer (HSBL) disposed on the first heat-sink layer; and
        a second heat-sink layer disposed on the HSBL; and
    a magnetic recording layer disposed on the SHSS,
        wherein a thermal resistance of the HSBL is greater than a thermal resistance of the first heat-sink layer, and the thermal resistance of the HSBL is greater than a thermal resistance of the second heat-sink layer.

2. The HAMR medium of claim 1, wherein the HSBL comprises two phases comprising a first-phase material and a second-phase material.

3. The HAMR medium of claim 2, wherein a thermal conductivity of the first-phase material is greater than a thermal conductivity of the second-phase material.

4. The HAMR medium of claim 2, wherein the first-phase material comprises columnar grains.

5. The HAMR medium of claim 2, wherein the first-phase material is epitaxially matched to at least one of a first heat-sink material of the first heat-sink layer and a second heat-sink material of the second heat-sink layer.

6. The HAMR medium of claim 1, wherein the HSBL comprises a single phase material.

7. The HAMR medium of claim 1, wherein the HSBL comprises CoX, wherein X is a second constituent selected from the group consisting of Cr, Pt, Ag, Ru and combinations thereof.

8. A heat-assisted magnetic recording (HAMR) medium, comprising:
a substrate;
a split heat-sink structure (SHSS), comprising:
a first heat-sink layer disposed on the substrate;
a heat-sink break layer (HSBL) disposed on the first heat-sink layer; and
a second heat-sink layer disposed on the HSBL; and
a magnetic recording layer disposed on the SHSS,
wherein the HSBL comprises CoX, wherein X is a second constituent selected from the group consisting of Cr, Pt, Ag, Ru and combinations thereof, and
wherein the HSBL comprises two phases, wherein a first phase material comprises the CoX and a second phase material comprises a third constituent, Y, selected from the group consisting of $SiO_2$, $SiO_x$, $MgO$, $Cr_2O_3$, $CrO_x$, $HfO_2$, $ZrO_2$, $TiO_2$, $TiO_x$, $Ta_2O_5$, $TaO_x$, $WO_3$, $WO_x$, and combinations thereof.

9. A heat-assisted magnetic recording (HAMR) medium, comprising:
a substrate;
a split heat-sink structure (SHSS), comprising:
a first heat-sink layer disposed on the substrate;
a heat-sink break layer (HSBL) disposed on the first heat-sink layer; and
a second heat-sink layer disposed on the HSBL; and
a magnetic recording layer disposed on the SHSS,
wherein the HSBL comprises CoX, wherein X is a second constituent selected from the group consisting of Cr, Pt, Ag, Ru and combinations thereof, and
wherein the CoX has a substantially hexagonal close-packed (HCP) crystal structure, and a (0002) preferred orientation.

10. A heat-assisted magnetic recording (HAMR) medium, comprising:
a substrate;
a split heat-sink structure (SHSS), comprising:
a first heat-sink layer disposed on the substrate;
a heat-sink break layer (HSBL) disposed on the first heat-sink layer; and
a second heat-sink layer disposed on the HSBL; and
a magnetic recording layer disposed on the SHSS,
wherein the HSBL comprises a mixture of a first phase and a second phase, wherein the first phase comprises a first-phase material comprising a metallic material with a columnar structure, and the second phase comprises a second-phase material comprising a material that is disposed between the grains of the first phase material.

11. The HAMR medium of claim 1, wherein a thickness of the first heat-sink layer is between about 5 nanometers (nm) to about 50 nm, a thickness of the HSBL is between about 1 nm to about 10 nm, and a thickness of the second heat-sink layer is between about 50 nm to about 100 nm.

12. The HAMR medium of claim 1, wherein a thickness of the first heat-sink layer is between about 50 nm to about 100 nm, a thickness of the HSBL is between about 1 nm to about 10 nm, and a thickness of the second heat-sink layer is between about 5 nm to about 50 nm.

13. A heat-assisted magnetic recording (HAMR) medium, comprising:
a substrate;
a split heat-sink structure (SHSS), comprising:
a first heat-sink layer disposed on the substrate;
a heat-sink break layer (HSBL) disposed on the first heat-sink layer; and
a second heat-sink layer disposed on the HSBL; and
a magnetic recording layer disposed on the SHSS,
wherein the first heat-sink layer and the second heat-sink layer comprise Ru, and the HSBL comprises a material selected from the group consisting of $CoCrSiO_2$, $CoPtSiO_2$, $CoAgSiO_2$, $CoRuSiO_2$, $CoCrTiO_2$, $CoPtTiO_2$, $CoAgTiO_2$, $CoRuTiO_2$, CoCr, CoPt, CoAg, and CoRu.

14. A heat-assisted magnetic recording (HAMR) medium, comprising:
a substrate;
a split heat-sink structure (SHSS), comprising:
a first heat-sink layer disposed on the substrate;
a heat-sink break layer (HSBL) disposed on the first heat-sink layer; and
a second heat-sink layer disposed on the HSBL;
a magnetic recording layer disposed on the SHSS;
an adhesion layer disposed between the substrate and the SHSS;
an amorphous underlayer (AUL) disposed on the SHSS;
an orientation-control layer disposed between the AUL and the magnetic recording layer; and
an overcoat layer disposed on the magnetic recording layer.

15. The HAMR medium of claim 1, wherein the HAMR medium is incorporated into a HAMR disk to include the HAMR medium.

16. The HAMR medium of claim 1, wherein the HAMR medium is incorporated into a HAMR data storage device, comprising:
a HAMR disk including the HAMR medium;
a HAMR slider including a slider substrate, the HAMR slider configured to fly over the HAMR disk; and
a HAMR head disposed on the slider substrate, wherein the HAMR head includes:
a write element configured to write data to the HAMR disk; and
a read element configured to read data from the HAMR disk; and
a laser disposed on the HAMR head, wherein the laser is configured to raise the temperature of the HAMR medium to reduce the coercivity thereof at a location on the HAMR disk whereat the write element is configured to write data.

17. The HAMR medium of claim 16, wherein the data storage device comprises a hard-disk drive (HDD).

18. A method for making a HAMR medium for heat assisted magnetic recording (HAMR), comprising:
providing a substrate;
depositing a split heat-sink structure (SHSS), comprising:
depositing first heat-sink layer on the substrate;
depositing heat-sink break layer (HSBL) on the first heat-sink layer; and
depositing second heat-sink layer on the HSBL; and depositing a magnetic recording layer on the SHSS,
wherein a thermal resistance of the HSBL is greater than a thermal resistance of the first heat-sink layer, and the thermal resistance of the HSBL is greater than a thermal resistance of the second heat-sink layer.

19. A method for making a HAMR medium for heat assisted magnetic recording (HAMR), comprising:
  placing a substrate in a thin-film deposition tool;
  depositing a split heat-sink structure (SHSS), comprising:
    depositing first heat-sink layer on the substrate;
    depositing heat-sink break layer (HSBL) on the first heat-sink layer; and
    depositing second heat-sink layer on the HSBL; and
  depositing a magnetic recording layer on the SHSS,
  wherein the HSBL comprises a mixture of a first phase and a second phase, wherein the first phase comprises a first-phase material comprising a metallic material with a columnar structure, and the second phase comprises a second-phase material comprising a material that is disposed between the grains of the first phase material.

20. The method of claim 19, wherein the first-phase material is epitaxially matched to at least one of a first heat-sink material of the first heat-sink layer and a second heat-sink material of the second heat-sink layer.

21. The method of claim 18, wherein the HSBL comprises a single phase material.

22. The method of claim 18, further comprising:
  depositing an adhesion layer on the substrate;
  depositing an amorphous underlayer (AUL) on the SHSS;
  depositing an orientation-control layer on the AUL; and
  depositing an overcoat layer on the magnetic recording layer.

* * * * *